United States Patent [19]

Bianchi et al.

[11] Patent Number: 4,756,207
[45] Date of Patent: Jul. 12, 1988

[54] MOTOR-SPEED REDUCER FOR THE SIMULTANEOUS DRIVING OF TWO STRUCTURES

[75] Inventors: Francois Bianchi, Valentigney; Alain Duval, Mandeure; Francois Fourrey, Montbeliard, all of France

[73] Assignee: Cycles Peugeot, Valentigney, France

[21] Appl. No.: 913,284

[22] Filed: Sep. 30, 1986

[30] Foreign Application Priority Data

Oct. 1, 1985 [FR] France ................... 85 14544

[51] Int. Cl.⁴ .................. F16H 37/06; F16H 57/02
[52] U.S. Cl. .................... 74/664; 74/606 R; 74/665 GD; 74/89.15; 74/425
[58] Field of Search ........... 74/89.15, 665 GD, 665 F, 74/665 G, 606 R, 16, 664, 425; 248/429, 430; 200/42.01, 42.02, 47

[56] References Cited

U.S. PATENT DOCUMENTS

| 1,696,344 | 12/1928 | Clark | 74/89.15 |
|---|---|---|---|
| 2,550,590 | 4/1951 | Parmilleux | 74/16 |
| 2,919,744 | 1/1960 | Tanaka | 248/429 |
| 2,933,809 | 4/1960 | McWilliams | 74/665 F |
| 3,066,907 | 12/1962 | Latimer | |
| 3,430,516 | 3/1969 | Pickles | 74/665 F |
| 3,482,459 | 12/1969 | Cantalupo et al. | 74/89.15 |
| 3,529,104 | 9/1970 | Angle | 200/47 |
| 3,727,472 | 4/1973 | Maekawa | 74/89.15 |
| 3,774,462 | 11/1973 | Thompson | 74/89.15 |
| 4,068,514 | 1/1978 | Chachin et al. | 74/89.15 |
| 4,466,769 | 8/1984 | Inaba et al. | 74/89.15 |

FOREIGN PATENT DOCUMENTS

| 1755740 | 1/1972 | Fed. Rep. of Germany . |
|---|---|---|
| 3235622 | 3/1984 | Fed. Rep. of Germany . |
| 1539452 | 6/1949 | France . |
| 259574 | 8/1968 | France . |

*Primary Examiner*—Lawrence Staab
*Attorney, Agent, or Firm*—Sughrue, Mion, Zinn, Macpeak and Seas

[57] ABSTRACT

The motor-speed reducer comprises an elongated tubular case (1) in which is disposed a motor (2) provided with two coaxial output shafts extending in opposite directions (4 and 6). Mounted on the end of each output shaft is an end portion (24) of a housing (22) of a speed reducer (18, 20). The end portion of the shaft has a worm (8, 10) which is engaged with an input worm wheel (32) of the speed reducer. The two speed reducers are preferably similar. A cassette (42) including an end-of-travel device and rotation detectors is mounted in the case (1) around the output shaft (6).

10 Claims, 2 Drawing Sheets

MOTOR-SPEED REDUCER FOR THE SIMULTANEOUS DRIVING OF TWO STRUCTURES

BACKGROUND OF THE INVENTION

The present invention relates to a tubular motor-speed reducer for the simultaneous driving of two structures which is more particularly adapted to the control of the displacements of either one of the two parts of an automobile seat structure. Each of these movements is usually controlled by two devices placed laterally under the seat structure which must be displaced simultaneously and exactly in the same way so that the transmission between the motor and these devices is often complex and even bulky. Now, it is increasingly necessary to have available under the seat structure of the vehicle a free space for increasing the comfort of the passengers.

SUMMARY OF THE INVENTION

An object of the present invention is to provide a motor-speed reducer which permits the simultaneous driving of two structures and is easy to place in position and has an extremely small overall size.

The invention provides a motor-speed reducer which comprises an elongated tubular case defining a cavity for an electric motor provided with two coaxial output shafts terminating in worms having opposite hands or the same hand, and a longitudinal conduit for the passage of electric supply conductors and, at each end of the case, a speed reducer whose housing is extended by an end portion clipped in the case.

The motor-speed reducer constructed in this way constitutes a unit which is of small size, has the desired length, and may be easily combined within a small space with other similar motor-speed reducers controlling other displacements. Its mounting is extremely simple, since the speed reducers are placed directly in the region of the structures to be driven.

According to another feature of the invention, the end portion of each speed reducer comprises a recess for receiving an internal projection of the case and is slid axially on the corresponding output shaft.

The mounting of the speed reducer on the case is thus extremely simple and permits the replacement of the speed reducer by another whenever this is necessary, i.e. the adaptation of the motor-speed reducer to the movements to be effected.

According to another feature, the speed reducer comprises an intermediate shaft connected to a worm wheel engaged with the worms of the shaft of the motor, and a hollow output shaft for connection to the structure to be driven, a gear drain interconnecting the two output shafts and comprising gear pinions having a suitable gear ratio connects the intermediate shaft and the output shaft and this gear may be modified without changing the manner in which the housing is mounted or its overall size.

It will be understood that the speed reducers placed at two ends of the case may be identical or different, depending one the use to which they are put.

BRIEF DESCRIPTION OF THE DRAWING

The following description of emobidments given by way of non-limiting examples and shown in the accompanying drawings will bring out the features and advantages of the invention.

In the drawings.

DESCRIPTION OF THE PREFERRED EMBODIMENT

Figure 1:
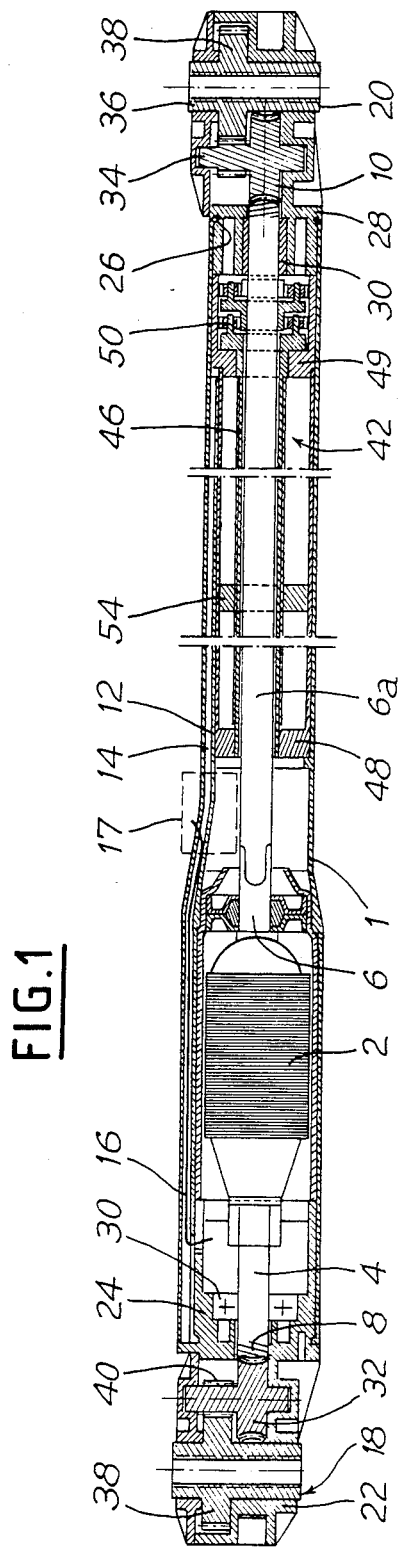
FIG. 1 is a longitudinal sectional view of a motor-speed reducer according to the invention, the motor and the output shafts not being shown in section for the purpose of simplifying the drawing.

The motor-speed reducer according to the invention has a tubular shape and is enclosed within an elongated case 1 of circular cross-sectional shape. Disposed within this case is a motor 2, preferably an electric motor, which is provided with two coaxial output shafts respectively 4 and 6. These shafts project in opposite directions from each end of the motor 2 and are each provided at their end with a worm 8, 10, the threads of these worms being of the same hand or of opposite hands. A longitudinal partition wall 12 defines, inside or outside the case 1, a conduit 14 which extends almost throughout the length of the case 1 and permits the passage of cables or other electric conductors 16 which connect the motor 2, outside the case, to a source of electric current (not shown) through an electric connector 17 connected to the case 1.

Mounted at each of the ends of the case 1 is a speed reducer 18, 20 which comprises a housing 22 extended by an end portion 24 which is fitted in the case 1. Preferably, each end portion 24 has a peripheral recess in which is fitted a circular projection 26 of the case. Further, the end portion 24 constitutes a shoulder 28 which comes to abut against the end of the case.

The end portion 24 is moreover provided with an axial passage whereby it can be fitted on the corresponding output shaft 4 or 6 and a bearing 30 can be mounted which is constituted by a ball bearing or simply by a bushing which carries this shaft and permits its rotation relative to the end portion 24.

Each of the shafts extends beyond the end portion 24 so that its worm 8 or 10 is engaged with a worm wheel 32 carried by an intermediate shaft 34 rotatively mounted in the housing 22. This housing also carries an output shaft 36 which is integral with a gear wheel 38 engaged with a gear wheel 40 integral with the intermediate shaft 34.

The ratio between the number of teeth of the gear wheels 38 and 40 is so chosen as to afford the desired speed reducing ratio.

The output shaft 36 is hollow and internally screwthreaded to permit its connection to the structure to be driven.

Figure 3:
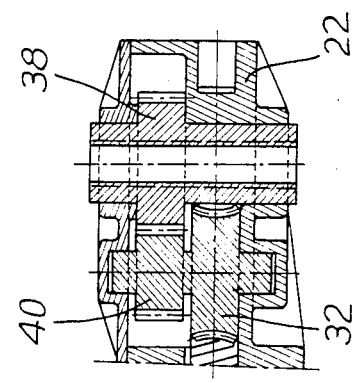
FIG. 3 is a view similar to FIG. 2 of another modification of the speed reducer.
Figure 2:
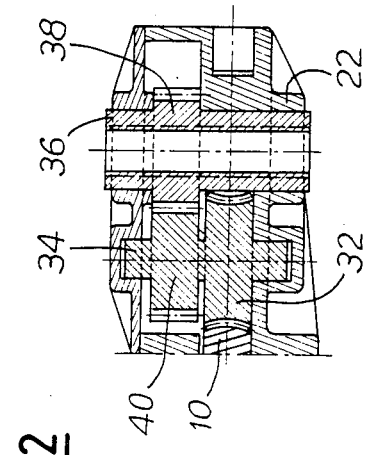
FIG. 2 is a view to an enlarged scale of a modification of the speed reducer of the motor-seed reducer of FIG. 1.
Figure 4:
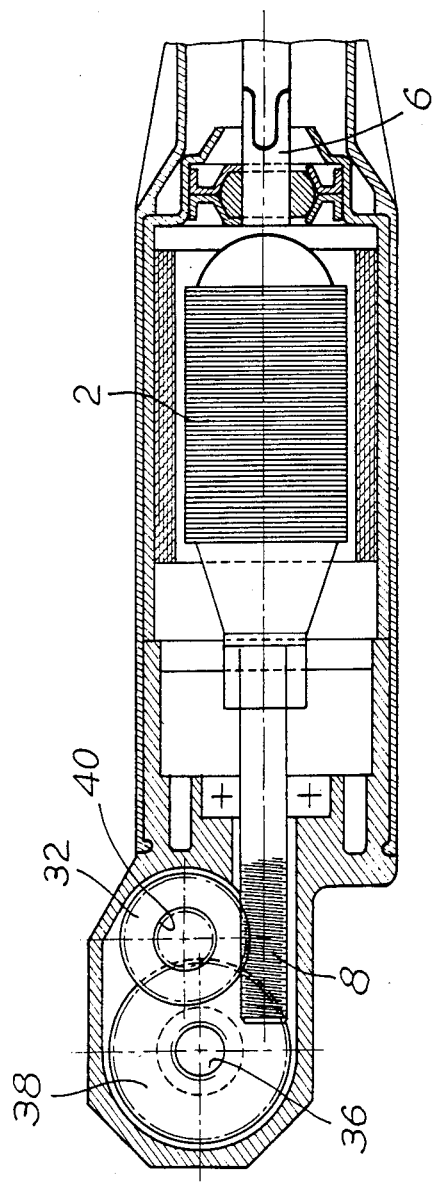
FIG. 4 is a partial longitudinal sectional view in a direction substantially perpendicular to that of FIG. 1.
Figure 5:
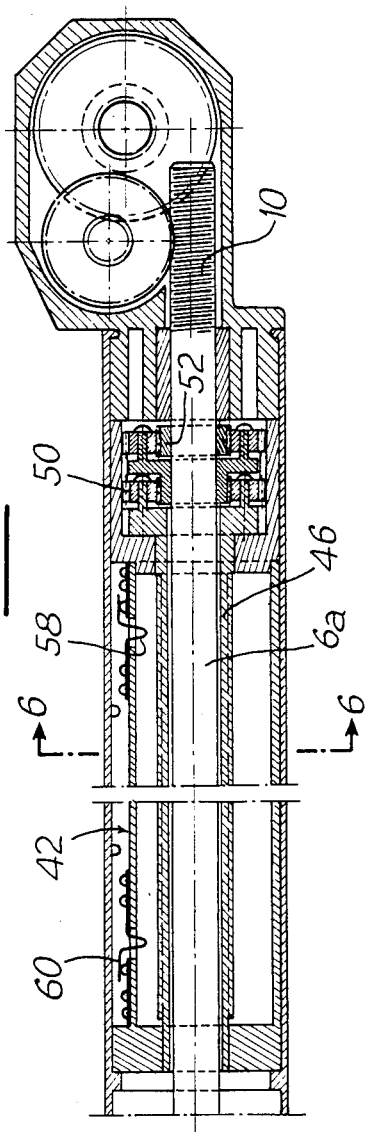
FIG. 5 is a partial view similar to FIG. 4 of the other end of the motor-speed reducer.

Preferably, as shown in FIG. 1, the speed reducers 18 and 20 are similar so that the two structures driven by the motor 2 effect simultaneously similar displacements. However, these speed reducers could if necessary have different speed-reducing ratios, the gear wheels 38 and 40 having diameters and numbers of teeth which are different from those shown in FIG. 1. For example, as shown in FIGS. 2 and 3, these gear wheels may have either numbers of teeth which are extremely close to each other (FIG. 2), or different numbers of teeth with a ratio lower than that of FIG. 1 (FIG. 3).

In any case, the speed reducers 18, 20 may be easily withdrawn from the case 1 or put back in position by a clipping of the end portion 24 onto the projection 26 so that the most appropriate speed reducer may be at any time mounted in the case 1 to ensure the desired drive.

Preferably, as illustrated, the case 1 comprises a portion of reduced width between the motor 2 and one of the speed reducers 20 and the motor is placed in the vicinity of one of the ends of this case. Consequently, one of the output shafts 4 is short, while the other opposite shaft 6 is of relatively great length. This shaft 6 is then preferably made in two parts: the output shaft of the motor proper and a transmission shaft 6a which is connected to the first shaft through a claw coupling or a universal type of joint so as to avoid risks of an angular displacement between these two parts of the shaft.

The motor-speed reducer constructed in this way may have any desired length, with a diameter, and consequently an overall size, which is relatively small. It may be easily used for driving two remote structures without requiring a large amount of space and may be simply mounted.

The case 1 may moreover contain around the portion 6a of the output shaft 6, a cassette 42 formed by a tubular element whose section substantially matches the inner shape of the case 1, i.e. which has a recess 44 in the region of the partition wall 12 of the conduit 14. This cassette is mounted on the shaft 6a which extends through a hollow worm 46 axially mounted in the cassette and rotatable relative to the two ends 48 and 49 of this cassette.

The worm 46 extends moreover at one of its ends beyond the end 49 so as to be connected through a speed reducer 50 to a gear wheel 52 integral with the output shaft 6a, in the vicinity of the worm 10 of the latter. A movable member 54 is mounted inside the cassette 42 and fixed to the worm 46. The shape of this movable member 54 is combined with that of the cassette 42 so as to prevent the rotation of the movable member relative to the worm and the cassette. On the other hand, the movable member 54 is free to move axially along the worm 46.

Figure 6:
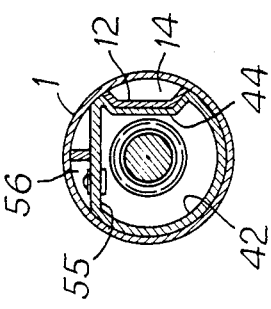
FIG. 6 is a sectional view taken on line 6—6 of FIG. 5.

As shown more particularly in FIG. 6, the cassette 42 comprises a planar side 55 which defines with the case 1 a narrow chamber 56 in which are for example mounted end-of-travel detectors 58, 60 and rotation detectors (not shown).

With this arrangement, the rotation of the shaft 6, 6a not only causes the displacement of the structure to be driven through the speed reducer 20 but also causes a rotation of the worm 46, i.e. an axial displacement of the movable member 54. Depending on the direction of rotation of the shaft 6a, the movable member approaches either of the detectors 58 or 60. When it reaches this detector, the latter causes the stoppage of the motor. A suitable adjustment of the initial position of the movable member 54 and the choice of the speed reducing ratio of the speed reducer 50 permit the stoppage of the motor 2 before any sudden contact of the structure to be driven with its extreme position, which reduces the risk of deteriotation of the assembly and prolongs the life of the system.

It will be understood that the cassette 42 could also contain a memory device or any other similar system facilitating the precision of the displacement control.

There is thus provided a motor-speed reducer whose operation may be precise and automatic while its mounting and its construction are simple and its overall size particularly small.

This motor-speed reducer permits the simultaneous driving of two structures undergoing identical movements or even different movements, and is easily adaptable to different devices. Indeed, the cylindrical shape of the end portion 24 and the transmission through a worm and worm wheel make it possible to give the speed reducer any desired position about the output shaft 4, 6, i.e. to give any orientation to the hollow shaft 36.

What is claimed is:

1. A motor-speed reducer for the simultaneous driving of two structures, comprising an elongated substantially cylindrical case which defines a cavity, an electric motor having two coaxial rigid output shafts extending from opposite ends of the motor, the motor and the output shafts being disposed within said cavity, worms provided on end portions of the output shafts, a longitudinal conduit combined with and extending axially alongside the case for enclosing electric supply conductors for the motor, a speed reducer provided at opposite ends of the case and comprising a housing and a cylindrical end portion extending the housing and axially removably mounted in the respective end of the case, the speed reducers having gear means including a worm wheel and an output shaft supported within the housing, and means for clipping and thereby detachably securing said two end portions of the two speed reducers in the case, said worm wheel within the housing being axially engageable with the respective worm when the respective housing is mounted in the case and axially removable from the worm when the housing is axially removed from the case after unclipping the clipping means.

2. A motor-speed reducer according to claim 1, wherein said clipping means comprise, for each housing, a peripheral recess in said end portion and an internal projection of the case engaged in the recess, a central passage extending through each of said end portions for the respective output shaft of the motor.

3. A motor-speed reducer according to claim 1, wherein the speed reducer comprises a worm wheel engaged with the corresponding worm and a hollow output shaft for connection to the structure to be driven.

4. A motor-speed reducer according to claim 1, comprising inside the case, around one of the output shafts, a removable cassette carrying detectors and a movable element drivenly engaged with the respective motor output shaft and cooperative the with end-of-travel detectors.

5. A motor-speed reducer according to claim 4, wherein the cassette comprises a planar side which defines with the case a chamber for the passage of an electric circuit of the detectors and for connection of the detectors the motor.

6. A motor-speed reducer according to claim 1, comprising a bearing mounted within each housing for supporting the respective output shaft of the motor adjacent to the respective worm.

7. A motor-speed reducer for the simultaneous driving of two structures, comprising an elongated tubular case which defines a cavity, an electric motor having two coaxial output shafts terminating in worms disposed in said cavity, a longitudinal conduit for the passage of electric supply conductors, a speed reducer comprising a housing and a cylindrical end portion extending the housing provided at opposite ends of the case, means for clipping said two end portions in the case, a cassette, end-of-travel detectors carried adjacent to opposite ends of the cassette, the cassette carrying a hollow worm drivenly connected to the output shaft through a speed reducer with which hollow worm movable element is screw-threadly engaged and along which the movable element moves axially upon rotation of the hollow worm.

8. A motor-speed reducer according to claim 7, wherein the motor is located in the vicinity of one end of the case and has an output shaft extending through the cassette to the speed reducer at the end of the case opposite said one end and constructed in two parts, a claw coupling interconnecting said two parts.

9. A motor-speed reducer according to claim 7, wherein the cassette comprises a planar side which defines with the case a chamber for the passage of an electric circuit of the detectors and for connection of the detectors the motor.

10. A motor-speed reducer for the simultaneous driving of two structures, comprising an elongated substantially cylindrical case which defines a cavity, an electric motor having two coaxial rigid output shafts extending from opposite ends of the motor, the motor and the output shafts being disposed within said cavity, worms provided on end portions of the output shafts, an inner conduit combined with and extending axially alongside the case for enclosing electric supply conductors for the motor, a speed reducer provided at opposite ends of the case and comprising a housing and a cylindrical end portion extending the housing and axially removably mounted the respective end of the case, the speed reducers having gear means including a worm wheel and an output shaft supported within the housing, and means for clipping and thereby detachably securing said two end portions of two speed reducers in the case, said worm wheel within the housing being axially engageable with the respective worm when the respective housing is mounted in the case and axially removable from the worm when the housing is axially removed from the case after unclipping the clipping means, said housings having a cross-sectional size substantially similar to the cross-sectional size of the case and being contained substantially within a geometrical cylindrical surface coaxial with the output shafts of the motor thereby forming a substantially cylindrical assembly from one housing to the other.

* * * * *